(12) United States Patent
Fishman et al.

(10) Patent No.: US 7,222,042 B2
(45) Date of Patent: May 22, 2007

(54) SYSTEM AND METHOD OF MEASURING TURN-ON AND TURN-OFF TIMES OF AN OPTOELECTRONIC DEVICE

(75) Inventors: Alex Fishman, Sunnyvale, CA (US); Serguei Dorofeev, Sunnyvale, CA (US); Dmitri Bannikov, Mountain View, CA (US); Robert Lee Fennelly, San Jose, CA (US); Andreas Weber, Los Altos, CA (US); Subra Nagarajan, Livermore, CA (US)

(73) Assignee: Finisar Corporation, Sunnyvale, CA (US)

( * ) Notice: Subject to any disclaimer, the term of this patent is extended or adjusted under 35 U.S.C. 154(b) by 753 days.

(21) Appl. No.: 10/694,933

(22) Filed: Oct. 27, 2003

(65) Prior Publication Data
US 2004/0091271 A1 May 13, 2004

Related U.S. Application Data

(60) Provisional application No. 60/422,598, filed on Oct. 31, 2002.

(51) Int. Cl.
G01M 19/00 (2006.01)
G01R 25/00 (2006.01)
G08B 23/00 (2006.01)
H04B 10/00 (2006.01)

(52) U.S. Cl. ........................ 702/125; 702/79; 340/527; 340/7.38; 398/139

(58) Field of Classification Search .................. 702/79, 702/122, 125; 340/527, 7.38; 398/139
See application file for complete search history.

(56) References Cited

U.S. PATENT DOCUMENTS

| | | | | |
|---|---|---|---|---|
| 4,875,150 A | * | 10/1989 | Matthes | ........................ 363/51 |
| 2004/0181296 A1 | * | 9/2004 | Muneta et al. | ................ 700/21 |
| 2005/0017875 A1 | * | 1/2005 | Nakayama et al. | .... 340/870.07 |

* cited by examiner

*Primary Examiner*—Jason Chan
*Assistant Examiner*—Quan-Zhen Wang
(74) *Attorney, Agent, or Firm*—Workman Nydegger

(57) ABSTRACT

Systems and methods are disclosed measuring the turn-on and turn-off times of an optoelectronic transceiver's transmitter circuitry. The method includes generating a two bit sequences from separate bit sequence generators using the same controlling pattern. The first bit sequence is transmitted through an optoelectronic device and compared with corresponding bit groups in the second bit sequence. The optoelectronic device is disabled and a count of compared bit groups is kept until the comparison indicates that the optoelectronic device is completely off. Using the count and one or more of the bit groups, a turn-off time is calculated. Alternatively, the method is used to calculate a turn-on time. The optoelectronic device is enabled and a count is kept from the time the device is enabled to when the comparison of the corresponding bit groups indicates that the optoelectronic device is completely on.

56 Claims, 7 Drawing Sheets

SYSTEM AND METHOD OF MEASURING TURN-ON AND TURN-OFF TIMES OF AN OPTOELECTRONIC DEVICE

CROSS-REFERENCE TO RELATED APPLICATIONS

This application claims the benefit of U.S. Provisional Application No. 60/422,598, filed Oct. 31, 2002.

BACKGROUND OF THE INVENTION

1. The Field of the Invention

The present invention relates generally to optical devices in high-speed communication networks. More particularly, the present invention relates to systems and methods for measuring the turn-on and turn-off times of optical circuitry in an optoelectronic device.

2. The Related Technology

Devices such as optoelectronic transceivers include lasers and electronic elements that must be turned on and off rapidly in order to, for example, be used effectively in passive optical networks. Passive optical networks are described in Applicant's U.S. Provisional Patent Application Ser. No. 10/188,575, filed Sep. 5, 2002 and entitled "SYSTEM FOR CONTROLLING BIAS CURRENT IN LASER DIODES WITH IMPROVED SWITCHING RATES," which is incorporated herein by reference.

Passive optical networks enable optoelectronic transceivers to share optical fibers while transmitting and receiving data in an optical form. Generally, a transceiver may not use all the bandwidth available on a fiber because data transmission is intermittent. As a result, transmitting and receiving data on optical fibers using more than one optoelectronic transceiver helps maximize the use of the network's bandwidth.

A passive network system utilizes the bandwidth available on a fiber by turning on a second transceiver when the first transceiver stops transmitting. Likewise, when the second transmitter finishes transmitting, another transmitter transmits data and so forth. Typically, passive optical networks employ a time division multiplexing access (TDMA) scheme to make this possible. In such schemes, the data transmission capabilities of the optoelectronic transceivers are operational only during separate, non-overlapping periods of time. Overlapping transceiver signals can cause unacceptable transmission errors in the passive optical network.

Because transceivers cannot transmit overlapping data, it is useful to ensure that a particular transceiver is completely off before the next transceiver begins transmitting data. However, when an optoelectronic transceiver receives a command to disable its optical transmitter circuitry, the response is not instantaneous. Instead, a measurable amount of time passes before the command is effectuated and the optical transmitter circuitry is turned off. Similarly, when an optoelectronic transceiver receives a command to enable its optical transmitter circuitry, the response time is also measurable. The amount of time required for turning optical transmitter circuitry on and off determines when a subsequent transmitter should be enabled to transmit data without causing an overlap in transmission with the first transceiver.

One method for ensuring that data does not overlap is to wait a predetermined period of time that is long enough to ensure that the first transceiver is not transmitting data when the subsequent transceiver begins transmitting data. However, this approach will likely result in unnecessarily long periods of time where the network is not transmitting data while it waits to ensure that the first transceiver has stopped. This approach fails to accomplish the object of utilizing as much of the network's bandwidth as possible.

Transceivers can make better use of network bandwidth by causing the subsequent transceiver to begin data transmission as soon as possible following the termination of data transmission by the first transmitter. Knowing the delay time for turning the transceiver on and off is useful for determining when a transceiver can be enabled without causing overlap in data transmission. By accounting for delay in the transceiver's turn-on and turn-off time, the transceiver can be configured to transmit data with much less delay between multiple transceiver transmissions than would otherwise be possible.

BRIEF SUMMARY OF THE INVENTION

The present invention relates to systems and methods for measuring the time required for an optoelectronic device to turn on and/or off. Embodiments of the invention are useful for optimizing the use of bandwidth in a passive optical network. By measuring the time needed to turn an optoelectronic device on or off, the bandwidth of a single transmission line can be used more effectively.

The systems and methods of the present invention measure the transceiver's turn-on and turn-off time. Passive optical networks use the delay time of the present invention to turn the multiple transceivers on and off such that no overlap will occur in data transmission and the time between successive transmissions will be minimized. By measuring the delay needed to turn a particular transceiver on or off, the command given to the next transceiver can be given such that the next transceiver begins transmitting after the turn-off time of the previous transceiver ends. In other words, the turn-off time for a particular receiver overlaps with the turn-on time of the next transceiver to minimize the delay between successive transceivers.

In one embodiment, the method for determining a turn off time includes the steps of 1) generating a first bit sequence by reference to a controlling pattern; 2) transmitting the first bit sequence to an optoelectronic device; 3) receiving the first bit sequence from the optoelectronic device and a second bit sequence generated by reference to the same controlling pattern; 4) commanding the disablement of the optoelectronic device after initiating the generating step; 5) comparing bit groups from the first bit sequence received from the optoelectronic device to corresponding bit groups in the second bit sequence—this step begins when the commanding step is executed; 6) maintaining a count that is incremented each time the comparing step is executed; 7) storing each bit group from the first bit sequence received from the optoelectronic device that does not match a corresponding bit group in the second bit sequence along with a corresponding value of the count; 8) terminating the comparing step when a bit group from the first bit sequence received from the optoelectronic device indicates that the optoelectronic device is turned off; and 9) computing the turnoff time by reference to one or more of the stored bit groups and corresponding counts.

The present invention also includes a method for measuring a turn-on time of an optoelectronic device. The method includes the steps of 1) generating a first bit sequence by reference to a controlling pattern; 2) transmitting the first bit sequence to an optoelectronic device; 3) receiving an output value of the optoelectronic device and a second bit sequence generated by reference to the controlling pattern—the output value corresponding to the first bit sequence when the optoelectronic device is enabled; 4) commanding the enablement of the optoelectronic device after initiating the generating step; 5) comparing groups of output values of the optoelectronic device to corresponding bit groups in the second bit sequence—this step beginning when the commanding step is executed; 6) maintaining a count that is incremented each time the comparing step is executed; 7) storing comparison results for each group of output values with an output value that matches a corresponding bit in a bit group in the second bit sequence along with a corresponding value of the count; 8) terminating the comparing step when an entire group of output values matches a corresponding bit group in the second bit sequence; and 9) computing the turn-on time by reference to one or more of the stored comparison results and corresponding counts.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. Moreover, while various headings are employed in the following discussion, such headings are included solely for the purpose of organizing and facilitating the disclosure hereof and are not intended, nor should they be construed, to define the invention or limit the scope of the invention in any way.

I. General Description of Aspects of an Exemplary Operational Setup

Embodiments of the present invention are used in a passive optical network to enable a plurality of optoelectronic transceivers to share one or more optical fibers while transmitting and receiving data in an optical form. While some of the embodiments described herein refer to optical networks, it should be understood that the present invention can be employed in other types of networks.

In one embodiment of a passive optical network, a plurality of optoelectronic transceivers are installed on a host device in the network. The transceivers are operably connected to one or more optical fibers such that multiple transceivers can transmit data on the same optical fiber. Consistent with network configurations, data transmitted over the optical fibers is then received by another set of transceivers that are connected with the network.

Figure 1:
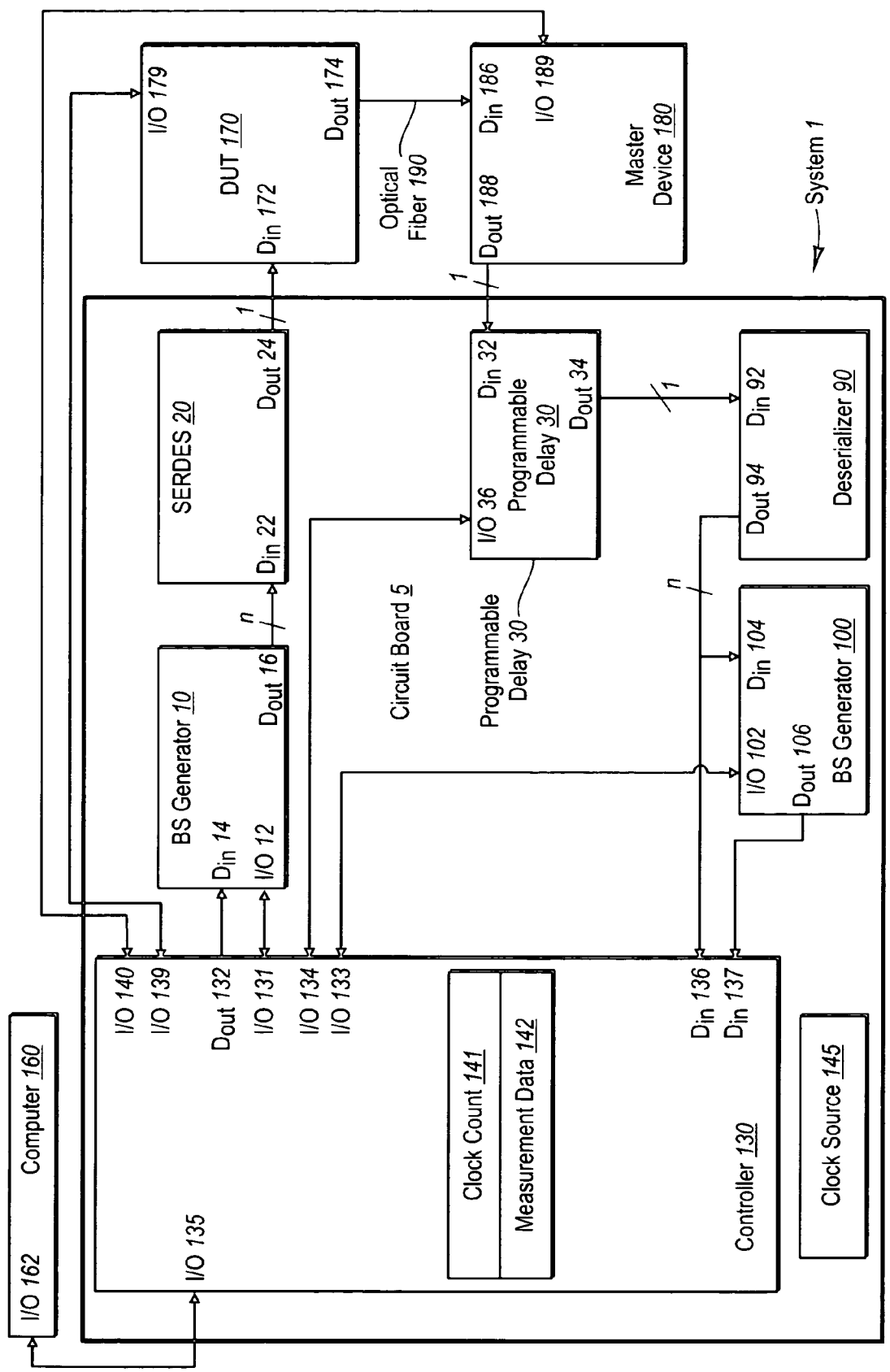
FIG. 1 is a block diagram of a system consistent with an embodiment of the present invention.

Referring to FIG. 1, there is shown a system 1 consistent with an embodiment of the present invention. As illustrated in FIG. 1, the system 1 includes a circuit board 5, a first bit sequence ("BS") generator 10, a serializer/deserializer ("SERDES") 20, a programmable delay 30, a deserializer 90, a second BS generator 100, a controller 130, a clock source 145, and a computer 160. Connected to the system 1, as illustrated in FIG. 1, are a device under test ("DUT") 170 and a master device 180. In one embodiment of the invention, DUT 170 is an optical transceiver in a fiber optic network.

The circuit board 5 is typically an insulated board that houses interconnected circuitry. The circuit board 5 typically provides power and ground connections (not illustrated) for various components mounted thereon.

The BS generators illustrated in FIG. 1 (i.e., the first and second BS generators 10, 100) are typically one or more types of linear feedback shift registers. For example, a given BS generator may be a binary shift register with taps that are modulo-2 added together and fed back to the binary shift register as input. Persons skilled in the art recognize that the configuration and function of the taps, or similar circuitry, typically define bit sequences produced by a BS generator. In particular, these configurations and functionalities define a second bit group that is produced when a first bit group is input to a BS generator.

The bit groups generated by a BS generator are typically output simultaneously in parallel form, but may be output serially as well. Additionally, bit sequences generated by a BS generator are preferably pseudo random bit sequences (or other deterministic sequences such as Gold, JPL, and Barker Codes). As a result, a plurality of BS generators can be configured in the same way so that each produces the same bit group from like input.

The BS generators illustrated in FIG. 1 preferably include an I/O port 12, a $D_{in}$ port, a $D_{out}$ port (i.e., the I/O port 12, $D_{in}$ port 14, and $D_{out}$ port 16 and the I/O port 102, $D_{in}$ port 104, and $D_{out}$ port 106 of the first and second BS generators 10 and 100, respectively), and a port for receiving a clock signal originating from the clock source 145 (connections not illustrated).

The $D_{in}$ port is typically a parallel port (n signals, channels, lines, etc.), but may be a serial port (1 signal, channel, line, etc.), that is used to receive data such as bit groups (e.g., a seed value that identifies a starting bit group in a sequence of bits). And the $D_{out}$ port is typically a parallel port, but may be a serial port, that is used to transmit bit groups.

The I/O port may be a parallel or serial port that is used to receive control signals from the controller 130. These control signals may, for example, configure a BS generator (e.g., configure the taps or similar circuitry that typically defines the type of bit sequences produced and the cycle length, uniformity, and independence of these bit sequences) and initiate and/or terminate the generation of a bit sequence by a BS generator.

The SERDES 20 is typically a device, such as an ON Semiconductor® 8-Bit parallel to serial converter MC100EP446, for receiving data in parallel and transmitting this data serially. As illustrated in FIG. 1, the SERDES 20 includes a $D_{in}$ port 22 and $D_{out}$ port 24. The $D_{in}$ port 22 is typically used to receive bit groups in parallel and the $D_{out}$ port 24 is typically used to serially transmit bit groups received through the $D_{in}$ port 22.

The SERDES 20 may also include one or more ports (not illustrated) for exchanging control signals with the controller 130 and for receiving a clock signal originating from the clock source 145. These ports enable the controller 130 to, for example, control how the SERDES 20 receives, transforms, and transmits data. These ports may, furthermore, include a plurality of separate signals for address bits, an alarm interrupt, a chip select, a write input, a read input, a bus type select, a test input, and an address latch enable.

The programmable delay 30 preferably comprises a programmable delay circuit (e.g., an ON Semiconductor ECL Programmable Delay Chip MC100EPI95). A data signal applied to an input of the programmable delay 30 reappears at an output of the programmable delay 30, after a delay of a specified amount of time. Preferably, both leading and trailing edges of data signal pulses are delayed by the same amount of time, which is typically programmable by the controller 130 using either a serial or parallel data input.

The programmable delay 30 preferably includes a $D_{in}$ port 32, a $D_{out}$ port 34, a I/O port 36, and a port for receiving a clock signal originating from the clock source 145 (connections not illustrated). The data signal generated by the master device 180 is transmitted to the programmable delay 30 through the $D_{in}$ port 32. The data signal, after the specified delay, is then transmitted to the deserializer 90 through the $D_{out}$ port 34. The controller 130 sets the delay of the programmable delay 30 through the I/O port 36, which functions as a control port accessible to the controller 130.

The deserializer 90 is typically a device, such as a MICREL 3.3V AnyRate MUX/DEMUX SY87724L, for receiving data in parallel and transmitting this data serially. As illustrated in FIG. 1, the deserializer 90 preferably includes a $D_{in}$ port 92 and a $D_{out}$ port 94. The $D_{in}$ port 92 is typically used to receive bit groups serially and the $D_{out}$ port 94 is typically used to transmit these bit groups in parallel.

The deserializer 90 may also include one or more ports (not illustrated) for exchanging control signals with the controller 130 and for receiving a clock signal originating from the clock source 145. These ports enable the controller 130 to, for example, control how the deserializer 90 receives, transforms, and transmits data.

The controller 130 typically comprises a computer processor on a microchip (e.g., a Motorola® 8-bit processor or other chip combining an 8-bit architecture with an array of field-programmable logic). The controller 130 directs the operation of circuitry on the circuit board (not all connections illustrated) and stores and manipulates data provided by this circuitry. The controller 130 completes these tasks, under the direction of the computer 160. In one embodiment of the present invention, the controller 130 may not have the capacity to perform measurements, which are described below, without the computer 160.

The controller 130 preferably includes a first I/O port 131, a $D_{out}$ port 132, a second I/O port 133, a third I/O port 134, a fourth I/O port 135, a first $D_{in}$ port 136, a second $D_{in}$ port 137, a fifth I/O port 139, a sixth I/O port 140, and a port for receiving a clock signal originating from the clock source 145 (connections not illustrated). The controller 130 may send and receive control signals, configuration data, etc. to some or all of the circuitry and/or devices illustrated in FIG. 1 without departing from the scope of the present invention.

In particular, the controller 130 may configure the BS generators and trigger or terminate the generation of bit sequences by the BS generators. The controller 130 preferably sends data to the first BS generator 10 through the $D_{out}$ port 132. This data is typically a seed value for the generation of a bit sequence, but may be other data as well. Additionally, the controller 130 transmits and receives control signals, configuration data, etc. to the second BS generator 100 through the second I/O port 133.

The controller 130 communicates with the computer 160 through the fourth I/O port 135. In preferred embodiments, the computer 160 exchanges control signals and/or data with the controller 130, which interacts with some or all of the other circuitry on the circuit board 5, to setup, initiate, and monitor measurements of the DUT 170.

The controller 130 also preferably includes logic for comparing a first group of bits to a second group of bits. More specifically, the controller 130 compares bits of like position within their respective group of bits (e.g., the second bit in a first group of bits is compared to the second bit in a second group of bits). In addition to making such comparisons, the comparator preferably stores comparison results, which may include a specification of individual bits within a group of bits that do not match. The controller 130 preferably includes the $D_{in}$ ports 136, 137 to receive bits for these comparisons from circuitry on the circuit board 5 (e.g., the deserializer 90 and the second BS generator 100).

Finally, the controller 130 also preferably includes logic to maintain, increment, and clear a clock count 141, which indicates the number of clock cycles that occur during, for example, a measurement of the turn-on or turn-off time of the DUT 170. The controller 130 also preferably includes logic for storing measurement data 142. The substance and use of the clock count 141 and the measurement data 142 is described in more detail below.

The clock source 145 is designed to provide a clock signal at a desired frequency. The clock source 145 may comprise a single, self-contained circuit (e.g., a Amptron® or Cardinal Components, Inc. crystal based oscillator). Such circuits are preferably single frequency circuits, but the clock source 145 may also have multiple-frequency capability. The clock source 145 may also comprise a plurality of circuits including a primary circuit and external timing components.

Preferably, the clock source 145 includes a plurality of ports to communicate a clock signal to some or all of the circuitry and devices illustrated in FIG. 1 (ports and connections not illustrated). The clock source 145 preferably includes an I/O port to receive configuration data from the controller 130 (e.g., a desired frequency) (ports and connection not illustrated). Also not illustrated in FIG. 1 are one or more demultiplexers and/or one or more dividers or multipliers that may be used to enable the clock source 145 to drive two or more components at one or more frequencies. For example, the SERDES 20, programmable delay 30, and deserializer 90 typically operate at a higher frequency than the controller 130 and the BS generators 10, 100.

The DUT 170 and the master device 180 are preferably any electronic device capable of receiving, transforming, and transmitting a data signal. Typically, these devices are optoelectronic transceivers. As such, these devices are capable of receiving a data signal in an electrical form and transmitting the data signal in an optical form and vice versa.

Each of these devices preferably include a $D_{in}$ and $D_{out}$ port (e.g., the $D_{in}$ port 172 and $D_{out}$ port 174 and the $D_{in}$ port 186 and $D_{out}$ port 188 of the DUT 170 and the master device 180, respectively) and an I/O port (e.g., the I/O port 179 and the I/O port 189 of the DUT 170 and the master device 180, respectively).

The $D_{in}$ port 172 of the DUT 170 is configured to receive data electrically from the SERDES 20. The $D_{out}$ port 174 of the DUT 170 is configured to transmit data optically to the master device 180. The $D_{in}$ port 186 of the master device 180 is configured to receive data optically from the DUT 170. The $D_{out}$ port 188 of the master device 180 is configured to transmit data electrically to the programmable delay 30.

The I/O ports are used to exchange control signals with the controller 130. In particular, the DUT 170 (and the master device 180) may receive, for example, a Transmitter Disable signal from the controller 130. Depending on the state of this signal (e.g., a digital one or zero), the optical transmitter circuitry of the DUT 170 is enabled or disabled. Finally, the master device 180 is preferably a device that has been confirmed to operate properly. The master device 180 provides the system 1 with the ability to receive a data stream of optical signals and convert that data stream into an electrical signal.

Figure 2:
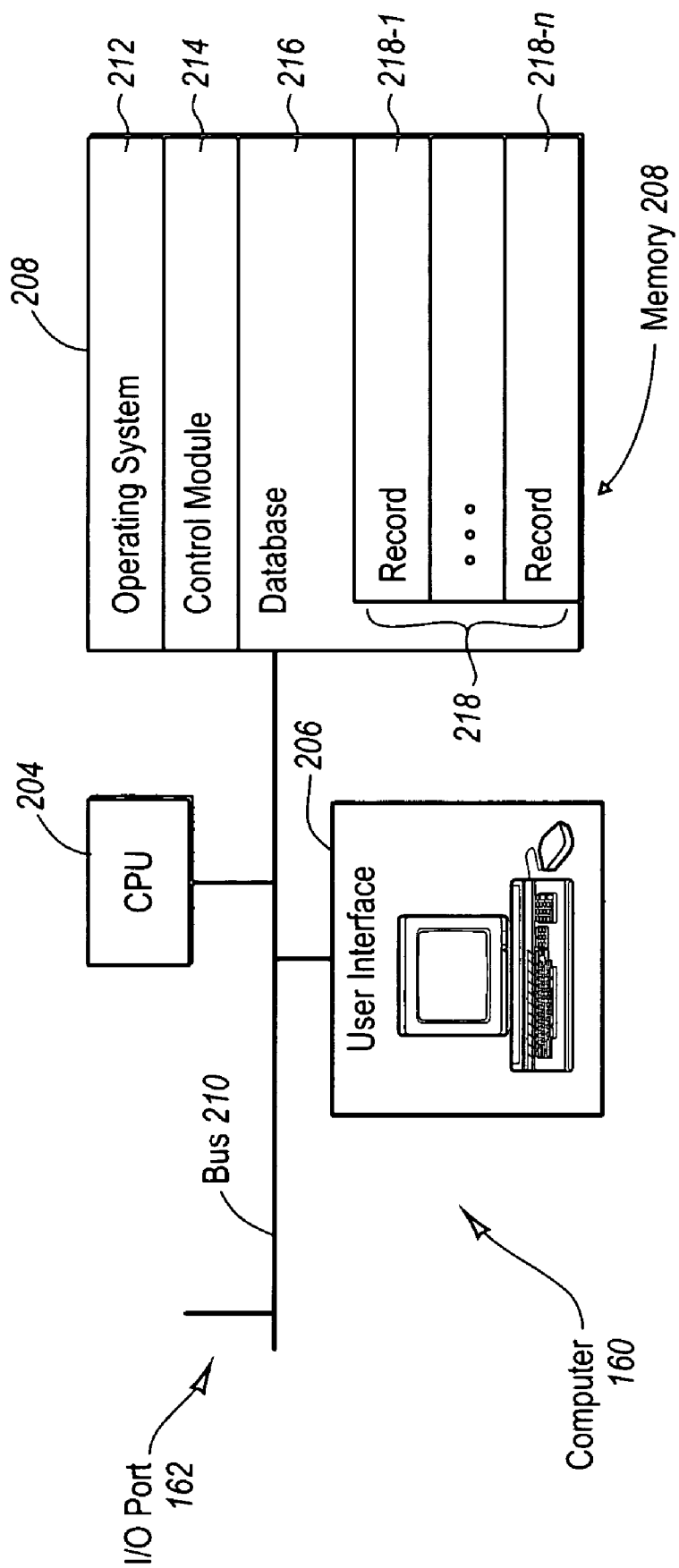
FIG. 2 is a block diagram of a computer consistent with an embodiment of the present invention.

Referring to FIG. 2, there is shown a more detailed illustration of the computer 160. In addition to the I/O port 162 illustrated in FIG. 1, the computer 160 preferably includes standard computer components such as one or more processing units 204, a user interface 206 (e.g., keyboard, mouse, and a display), memory 208, and one or more busses 210 to interconnect these components. The memory 208, which typically includes high speed random access memory as well as non-volatile storage such as disk storage, may store an operating system 212, a control module 214, and a database (or one or more files) 216, which may include a plurality of records 218. The operating system 212 may include procedures for handling various basic system services and for performing hardware dependent tasks. The one or more processing units 204 may execute, for example, tasks for the control module 214 under the direction of the operating system 212. The operating system may also provide the control module 214 with access to other system resources such as the memory 208 and the user interface 206.

The control module 214 is designed to manipulate the system 1 in accordance with the present invention. In particular, the control module 214 preferably interacts with the controller 130 through the I/O port 162 to initiate and monitor measurements of the DUT 170. As described in more detail below, the control module 214 directs the controller 130 to initialize one or more other components included in the system 1 and, if need be, to obtain information about the one or more other components that are not connected directly to the computer 160. The control module 214 may engage in such communication with the controller 130 before, during, and after measurements of the DUT 170. The control module 214 may communicate results of DUT measurements through the user interface 206 as needed. Finally, the computer 160 may communicate with other devices, such as Digital Communication Analyzers (not illustrated), during measurements of a DUT 170. Persons skilled in the art recognize that a Digital Communication Analyzer can provide additional information about the operation of a DUT 170 by monitoring the data transmitted by the DUT 170.

Although separate ports are illustrated in FIGS. 1 and 2 and discussed above with respect to various circuitry, some embodiments of the present invention may include additional or fewer ports without departing from the scope of the present invention. For example, a single data bus with address bits and corresponding ports may be substituted for some or all of the data ports and corresponding connections illustrated in FIG. 1. Additionally, some or all of the port connections, though illustrated in FIGS. 1 and 2 as single leads, may be formed by a plurality of separate leads. The configuration illustrated in FIGS. 1 and 2, therefore, represents just one embodiment and is not meant to limit the scope of the present invention.

II. Determining the Turn-off/On-Time of a Transmitter

Referring to FIGS. 3A–3E, there are shown a series of processing steps included in a preferred embodiment of the present invention. The steps of FIGS. 3A–3E may be conceptually divided into five somewhat overlapping phases. In a first phase (e.g., steps 302–304), the circuitry and devices illustrated in FIG. 1 are initialized. In a second phase (e.g., steps 310–340), the data received from the master device is properly aligned with a clock signal. In a third phase (e.g., steps 341–358), a proper configuration of the system 1, the DUT 170, and the master device 180 is confirmed and a seed value used by the second BS generator during the fourth phase is identified. The third phase preferably continues until consecutive groups of bits without any bit errors are transmitted or until it times out. In a fourth phase (e.g., steps 360–389), data needed to compute the turn-on and turn-off times of the DUT 170 is gathered. In a fifth phase (e.g., steps 390–394), the turn-on and turn-off times are calculated for the DUT 170 and/or the results of the measurement (attempt) are displayed.

A. Phase I: Initializing the System

Figure 3A:
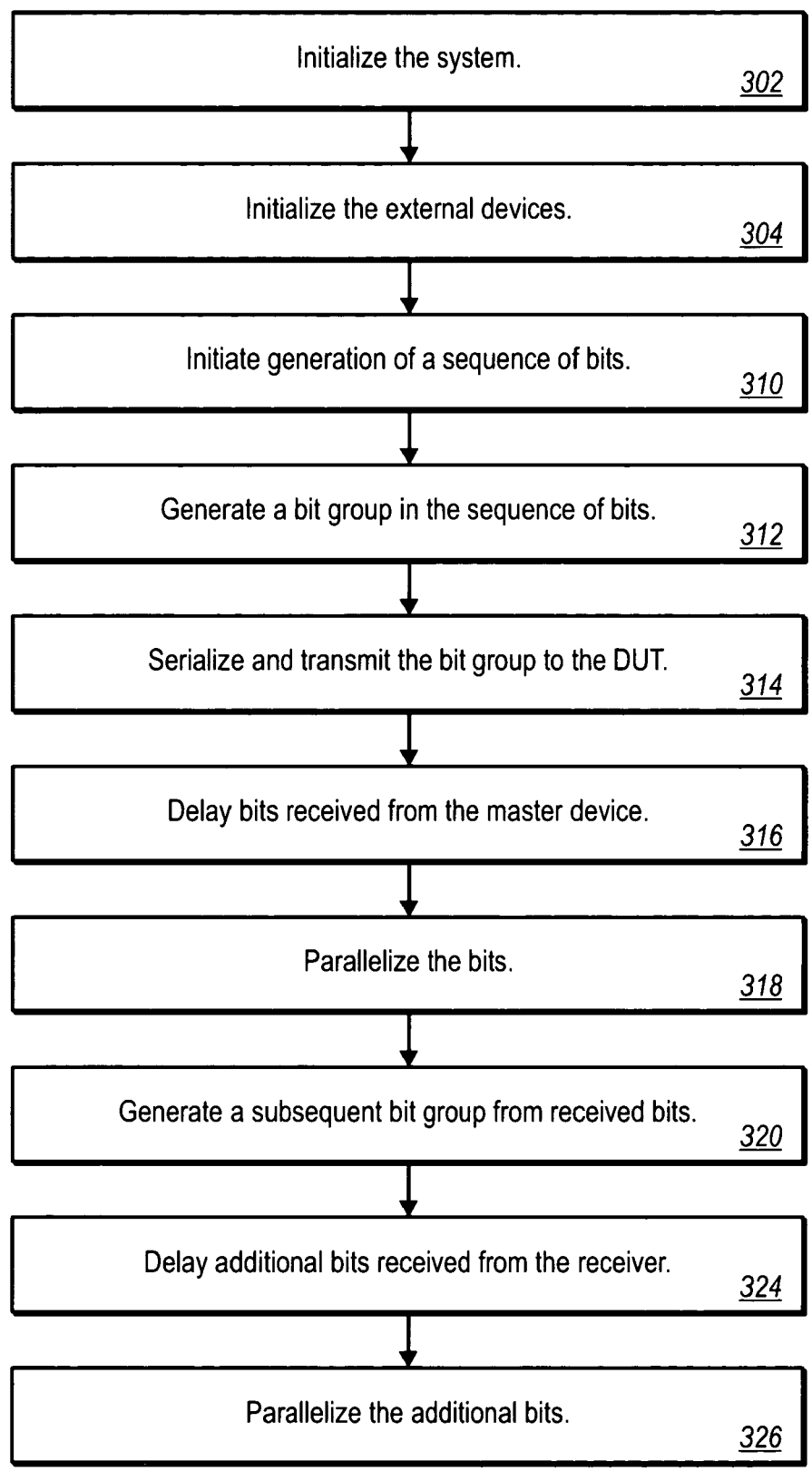
FIGS. 3A–3E illustrate processing steps consistent with an embodiment of the present invention.

In a first phase, the control module 214 initializes the system 1 (step 302, FIG. 3A). In particular, the control module 214 preferably directs the controller 130 to set the clock frequency of the clock signal generated by the clock source 145 and to turn the clock source 145 on. The control module 214 may also direct the controller 130 to set the length, type, and other characteristics of bit sequences generated by the BS generators. The controller 130 accomplishes this task by, for example, transmitting control-signals through its first I/O port 131 and second I/O port 133 to the I/O port 12 and the I/O port 102 of the first and second BS generators 10, 100, respectively. The control module 214 may also direct the controller 130 to clear the clock count 141 and the measurement data 142. The control module 214 may create a new record 218 in the database 216 to store results of a DUT 170 measurement. Finally, the control module preferably directs the controller 130 to set the delay value of the programmable delay 30. In preferred embodiments of the present invention, this delay value is initially set to the lowest delay value possible. As persons skilled in the art know, some programmable delay circuits have an inherent non-zero, minimum delay value.

The control module 214 then initializes external devices (step 304). In particular, the control module 214 preferably directs the controller 130 to turn on the DUT 170 and the master device 180 and enable the optical transmitter circuitry of the DUT 170 by, for example, adjusting the state of a Transmitter Disable control signal. More specifically, the controller 130, under the direction of the control module 214, may transmit these control signals through its I/O port 139 to the I/O port 179 of the DUT 170 and through its I/O port 140 to the I/O port 189 of the master device 180.

The control module 214 then initiates the generation of a sequence of bits (step 310). This task is preferably completed by the controller 130, under the direction of the control module 214. In particular, the controller 130 may transmit a seed value through its $D_{out}$ port 132 to the $D_{in}$ port 14 of the first BS generator 10. In some embodiments of the present invention, the controller 130, under the direction of the control module 214, also transmits a control signal through its I/O port 131 to the I/O port 12 of the first BS generator 10 to enable the generation of the sequence of bits by the BS generator 10.

B. Phase II: Synchronizing the Bit Sequence with the Clock

In response to step 310, the first BS generator 10 begins generating a sequence of bits by generating a bit group in the sequence of bits (step 312). In preferred embodiments of the present invention, bit groups are generated sequentially and transmitted in parallel. The BS generator 10 preferably operates (i.e., generates bit groups) at the frequency of a clock signal originating from the clock source 145 (connections not illustrated). The first BS generator 10 continues to generate bit groups in the sequence of bits (repeating the sequence of bits if necessary) until disabled by the controller 130.

Each bit group generated by the first BS generator 10 is serialized by the SERDES 20 and transmitted to the DUT 170Q (step 314). In other words, the SERDES 20 receives bit groups through its $D_{in}$ port 22 from the first BS generator 10 in parallel, but transmits these bit groups serially through its $D_{out}$ port 24.

The DUT 170 receives bits transmitted by the SERDES 20 through its $D_{in}$ port 172 in an electrical form and transmits them in an optical form through its $D_{out}$ port 174 to the master device 180. The master device 180 receives bits transmitted by the DUT 170 through its $D_{in}$ port 186 in an optical form and transmits them in an electrical form through its $D_{out}$ port 188 to the deserializer 90 via the programmable delay 30.

The programmable delay 30 separately receives bits transmitted by the master device 180 and delays by a specified amount before transmitting these bits to the deserializer 90 (step 316). More specifically, the programmable delay 30 receives bits transmitted serially by the master device 180 through its $D_{in}$ port 32 and transmits these bits after the specified delay through its $D_{out}$ port 34 to the deserializer 90.

The deserializer 90 receives bits transmitted serially by the programmable delay 30 and parallelizes them (step 318). More specifically, the deserializer 90, using a clock signal from the clock source 145, receives bits transmitted serially by the programmable delay 30 through its $D_{in}$ port 92 and transmits these bits as a bit group in parallel through its $D_{out}$ port 94 to both the controller 130 and the second BS generator 100. The clock signal used by the deserializer to receive serial data bits may be the fastest clock generated by the clock source 145.

The second BS generator 100 generates a subsequent bit group from the bit group received through its $D_{in}$ port 104 from the deserializer 90 (step 320). Bit sequences generated by the BS generators illustrated in FIG. 1 are deterministic, so when configured in the same manner, these BS generators generate the same bit group from a given bit group. The output of the first BS generator 10 is typically fed back to the first BS generator 10 to generate another bit group in the sequence of bits. Similarly, the second BS generator 100 uses the bit group transmitted to it by the deserializer 90 as a seed value to generate a subsequent bit group in the sequence of bits. Because the second BS generator 100 is configured to produce the same sequence of bits as the first BS generator 10, the second BS generator 100 generates the same bit group that the first BS generator 10 generates from a given bit group.

The subsequent bit group is transmitted by the second BS generator 100 through its $D_{out}$ port 106 to the second Din port 137 of the controller 130, but the subsequent bit group is not output by the second BS generator 100 until a subsequent clock cycle. And while the deserializer 90 transmits the bit group to the BS generator 100 in step 318, the programmable delay 30 delays another bit group received from the master device 180 (step 324). The deserializer then parallelizes this bit group (step 326). As indicated above, parallelizing a bit group includes transmitting the bits in parallel to both the controller 130 and the second BS generator 100. So the bit group received in step 324 is transmitted to the controller 130 during the same clock cycle in which the subsequent bit group generated by the BS generator 100 in step 320 is transmitted to the controller 130.

Figure 3B:
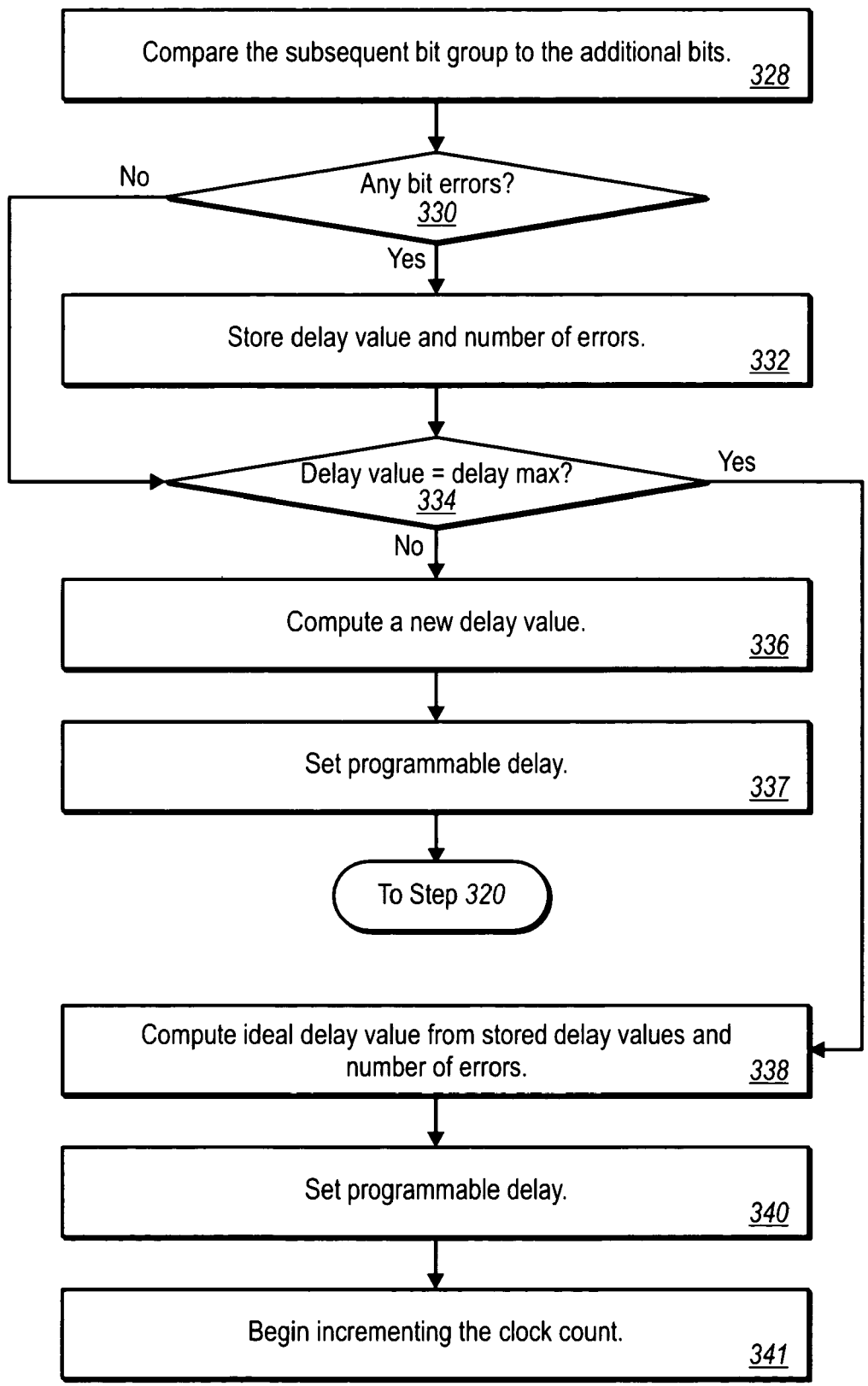

The controller 130 compares the bit groups transmitted by the deserializer 90 and the Second BS generator 100, respectively (step 328, FIG. 3B). If there are any bit errors (i.e., one or more of the bits do not match) (step 330—Yes), the results of the comparison (e.g., the number of bit errors) along with the delay value of the programmable delay 30 are stored as part of the measurement data 142 (step 332).

If there are no bit errors (step 330—No) or after storing the results of the comparison and the delay value (step 332), the controller 130 determines whether the delay value of the programmable delay 30 is equal to the delay value maximum (step 334). This determination can be made by, for example, interfacing with the programmable delay 30 through an I/O port or by maintaining the current delay value as part of the measurement data 142 and updating it each time the programmable delay 30 is updated. In some embodiments of the present invention, the delay value maximum is approximately equal to the duration of two unit intervals of the data signal transmitted through the DUT 170 and master device 180.

If the delay value of the programmable delay 30 is not equal to the delay value maximum (step 334—No), the controller 130 computes a new delay value for the programmable delay 30 (336). The new delay value is preferably computed by incrementing the current delay value by an amount that is a fraction of the unit interval mentioned in the preceding paragraph. The controller 130 then sets the programmable delay 30 with the new delay value (step 337). The controller 130 may also update the measurement data 142 to include the new delay value as well.

Steps 320–337 are then preferably repeated until the delay value of the programmable delay 30 is equal to the delay value maximum (step 334—Yes). When this occurs, the controller 130 computes an ideal delay value from the bit error counts and corresponding delay values stored in the measurement data 142 (step 338).

In one embodiment, the controller 130 begins by sequentially scanning the bit error counts and corresponding delay values stored in the measurement data 142 for a first delay, which corresponds to a bit error count below a defined threshold. The scanning preferably begins with the minimum delay and ends with the maximum delay. After locating the first delay, scanning continues for a-second delay, which corresponds to a bit error count above the defined threshold. Bit error counts above the defined threshold tend to occur when a data signal is sampled at or close to a temporal boundary of a bit period since a data signal does not switch from one state to another instantaneously. The threshold is preferably selected, therefore, so that an equal or greater bit error count is indicative of a sample taken near a temporal boundary of a bit period instead of just bit errors that can and do occur for other reasons. Similarly, the threshold is preferably selected so that it is unlikely that the bit error count of subsequent delays will drop below the threshold until after a temporal boundary of the bit period has passed. This last requirement prevents small increases in bit error counts, which might not be associated with a temporal boundary of a bit period, from being misinterpreted.

Additionally, the increment used to adjust the delay value in step 336 is preferably small enough so that at least one delay corresponds to the region of time at or just before a temporal boundary of a bit period and at least one delay corresponds to the region of time just after a temporal boundary of a bit period. As a result, the second delay ideally corresponds to the region of time at or just before a temporal boundary of a bit period.

After finding the second delay, scanning continues for a third delay, which corresponds to a bit error count below the defined threshold. And ideally, the third delay corresponds to a region of time just after a temporal boundary of a bit period.

After finding the second and third delays (e.g., a first temporal boundary of a bit period), the controller 130 continues scanning for a fourth and fifth delay (e.g., a second temporal boundary of the bit period). The fourth delay is the next delay corresponding to a bit error count above the defined threshold. Additionally, the fifth delay is the next delay—following the fourth delay—corresponding to a bit error count below the defined threshold.

After the second, third, fourth, and fifth delays are located (e.g., two temporal boundaries of a bit period have been located), they are summed and divided by four. The result is a delay value that corresponds to a sampling position roughly midway between the temporal boundaries of a bit period.

Note that in some embodiments of the present invention, a plurality of bit groups are transmitted for each value of the delay value stored in the programmable delay 30. In these embodiments, the clock count 141 may be used to track how many bit groups have been transmitted with a given delay value. Each time the delay value is updated, the clock count 141 is cleared. In these embodiments, an extra test may be conducted before calculating and setting the delay value in steps 336 and 337. If some predefined count value has not yet been reached, steps 336 and 337 are not executed before returning to step 320. Transmitting a plurality of bit groups for each delay value enables a more accurate determination of the ideal delay value. Also, the clock count 141 is cleared upon completion of this phase as well so as not to interfere with the next phase.

C. Phase III: Testing the System and Generating a Seed Value

The controller 130 then sets the programmable delay 30 with the ideal delay value calculated in step 338 (step 340) and begins incrementing the clock count 141 (step 341) each time a bit group is received from the deserializer 90.

Figure 3C:
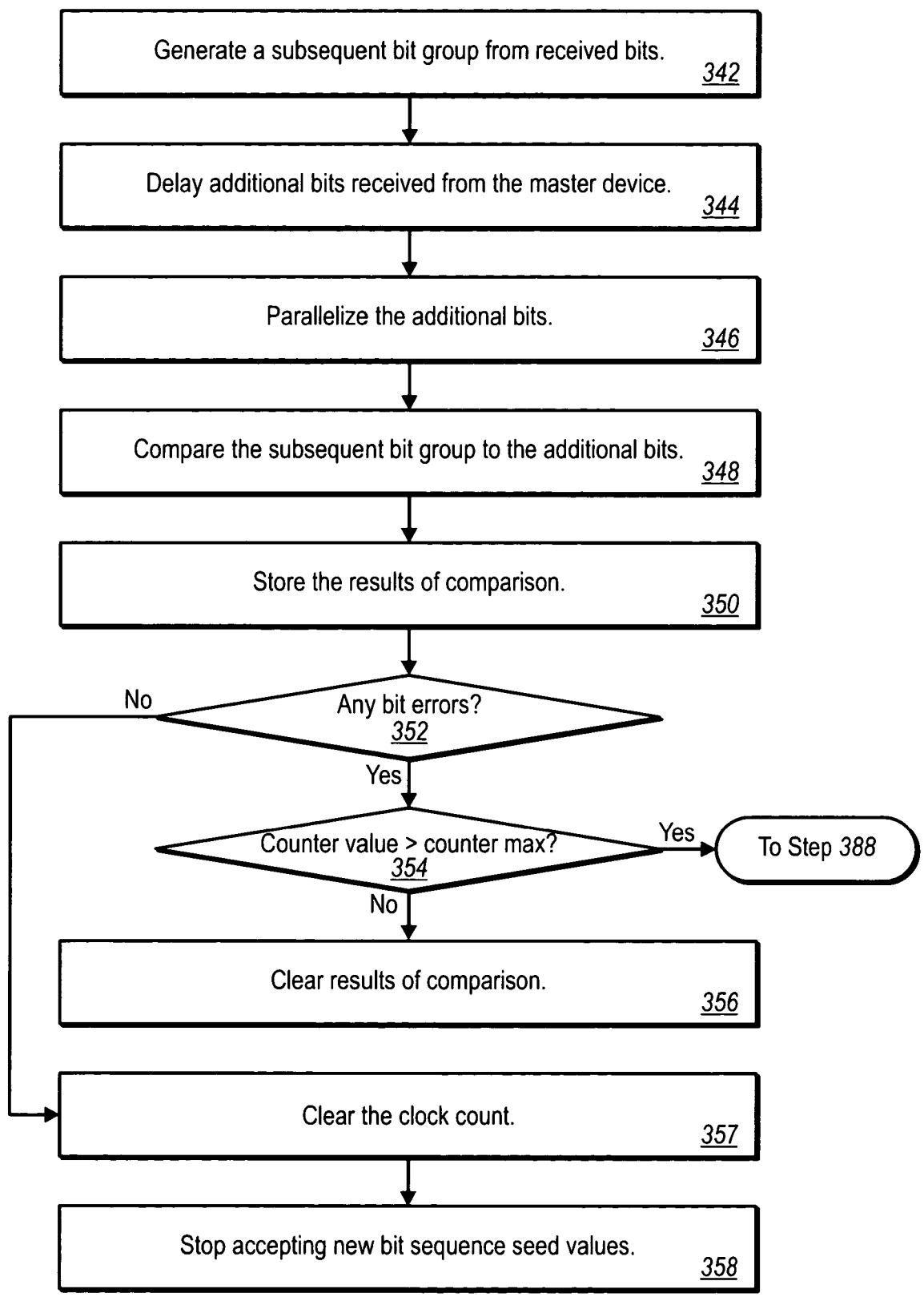

The second BS generator 100 then generates a subsequent bit group from a bit group received through its $D_{in}$ port 104 from the deserializer 90 (step 342, FIG. 3C). The subsequent bit group is transmitted by the second BS generator 100 through its $D_{out}$ port 106 to the second $D_{in}$ port 137 of the controller 130, but the subsequent bit group is not output by the second BS generator 100 until a subsequent clock cycle. And while the deserializer 90 transmits the bit group to the BS generator 100 in step 318, the programmable delay 30 delays another bit group received from the master device 180 (step 344). The deserializer then parallelizes this bit group (step 346) as described above.

The controller 130 compares the bit groups transmitted by the deserializer 90 and the second BS generator 100, respectively (step 348) and stores the results of the comparison (e.g., the number of bit errors) as part of the measurement data 142 (step 350).

If there are any bit errors (i.e., one or more of the bits do not match) (step 352—Yes), the controller 130, checks the value of the clock count 141 to determine whether it is greater than a predefined counter value (e.g., a counter value maximum) (step 354), which may be maintained by either the controller 130 or the computer 160.

As noted above, the purpose of the third phase is to confirm the configuration of the system 1, the DUT 170, and the master device 180 and to identify a seed value for the second BS generator 100. If the clock count 141 exceeds the predefined counter value, it may be safely assumed that the system 1, the DUT 170, and the master device 180 are not configured properly.

If the clock count 141 is not greater than the predefined counter value (step 354—No), the controller 130, under the direction of the control module 214, may clear the bit error count stored in the previous execution of step 350 (step 356). The cycle of receiving bit groups, generating subsequent bits groups, and comparing the two then continues until there are no bit errors or the clock count 141 exceeds the predefined counter value. Note that the second BS generator 100 continues to accept new bit sequence seed values from the deserializer 90. Because there were one or more bit errors detected during the most recent bit group comparisons, it may be that the bit sequence seed values used to produce two of the compared bit groups are invalid.

If the clock count 141 is greater than the predefined counter value (step 354—Yes), the results of the measurement may be displayed via the user interface 206 (step 394). If step 394 is reached in this fashion, the results will indicate that there is a problem with the configuration of the DUT 170, the master device 180, and/or the system 1 and that an actual measurement was never made.

Figure 3D:
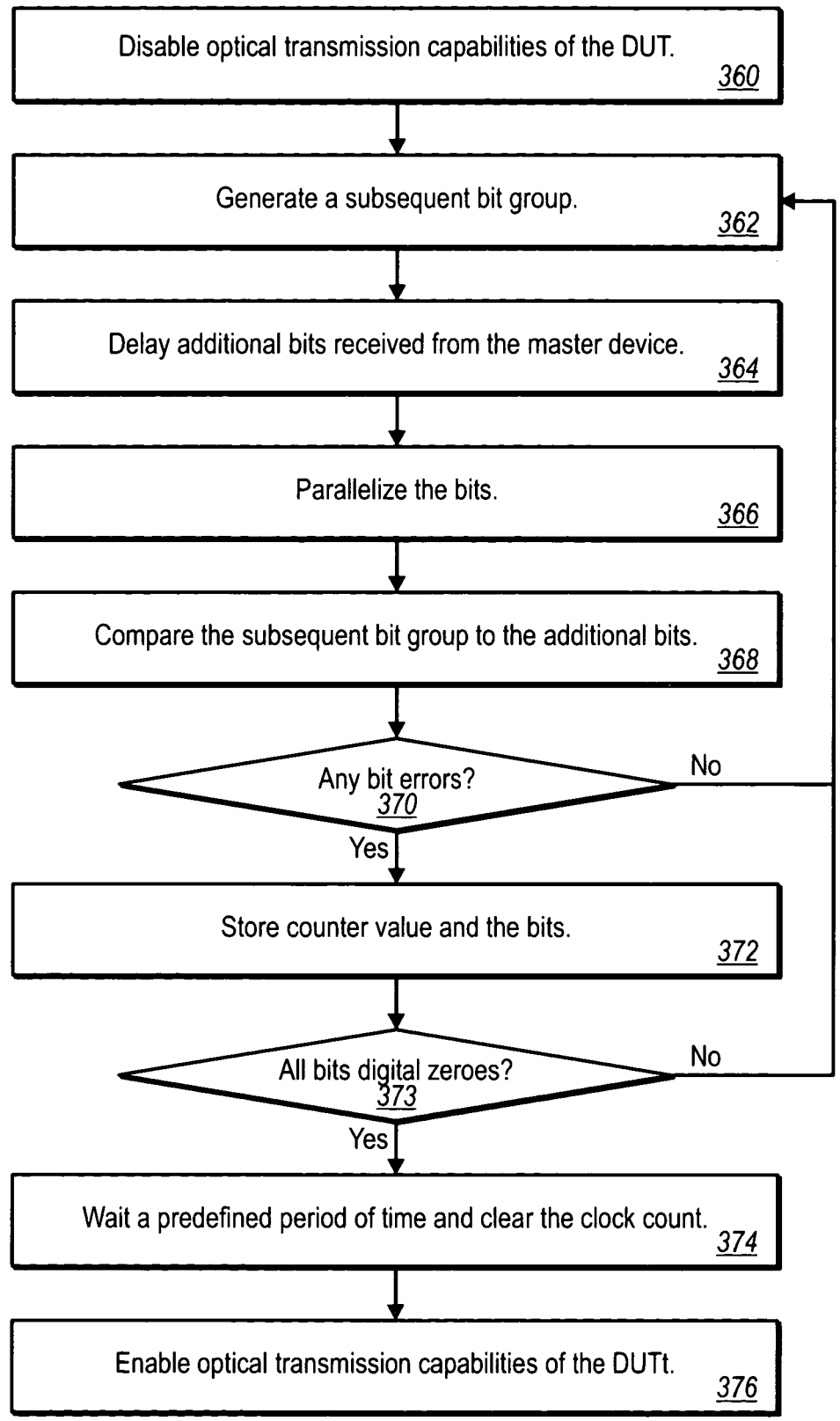

Returning to step 352, if there are no bit errors (step 352—No), the controller 130, under the direction of the control module 214, clears the clock count 141 (step 357), directs the second BS generator 100 to stop accepting bit groups from the deserializer 90 (step 358), and disables the optical transmitter circuitry of the DUT 170 (step 360, FIG. 3D).

D. Phase IV: Collecting Transmitter Data and Calculating the Turn-off and Turn-on Time Step 358 marks the end of the third phase and the beginning of the fourth phase. As indicated above, the third phase identifies a bit sequence seed value for the second BS generator 100. This happens when consecutive bit group are transmitted without bit errors. This means that the second BS generator 100 may now generate the exact bit sequence generated by the first BS generator 10 without additional bit sequence seed values from the deserializer 90. Instead, the subsequent bit groups generated by the second BS generator 100 will now be fed back to the second BS generator, as seed values to generate additional subsequent bit groups. The controller 130 may direct the second BS generator 100 to stop accepting bit groups from the deserializer 90 by, for example, transmitting control signals through its second I/O port 133 to the I/O port 102 of the second BS generators 100. Further, the controller 130 may disable the optical transmitter circuitry of the DUT 170 by, for example, adjusting the state of a Transmitter Disable signal transmitted to the DUT 170 through the fifth I/O port 139 of the controller 130 and the I/O port 179 of the DUT 170.

The second BS generator 100 then generates a subsequent bit group from the "subsequent bit group" compared during the most recent execution of step 348 (step 362). This previous "subsequent bit group" is fed back to the second BS generator 100. The programmable delay 30 delays another bit group received from the master device 180 (step 364) and then the deserializer 90 parallelizes this bit group (step 366) as described above.

The controller 130 then compares the bit groups transmitted by the deserializer 90 and the second BS generator 100, respectively (step 368). If there are not any bit errors (step 370 No), steps 362–368 are repeated. But if there are any bit errors (step 370—Yes), the controller 130 stores the bit group received from the deserializer 90 and the value of the clock count 141 as part of the measurement data 142 (steps 372).

Further, if all of the bits are not digital zeroes (step 373—No), steps 362–368 are repeated. In other words, the controller 130 continues to store bit groups and values of the clock count 141 in step 372 until the DUT 170 is completely off (i.e., when all of the bits "output" by the DUT 170 are digital zeroes). Storing these bit groups enables the calculation of a turn-off time with unit interval precision as described in more detail below.

Once all of the bits are digital zeroes (step 373—Yes), the controller waits a predefined period of time and then clears the clock count 141 (step 374) and enables the optical transmitter circuitry of the DUT 170 (step 376). The amount of time waited by the controller 130 may change from one embodiment to the next. The clock count 141 is cleared so that a subsequent count corresponds to clock cycles that occur after the optical transmitter circuitry of the DUT 170 is enabled in step 376. Further, the controller 130 may enable the optical transmitter circuitry of the DUT 170 by, for example, readjusting the state of a Transmitter Disable signal transmitted to the DUT 170.

Figure 3E:
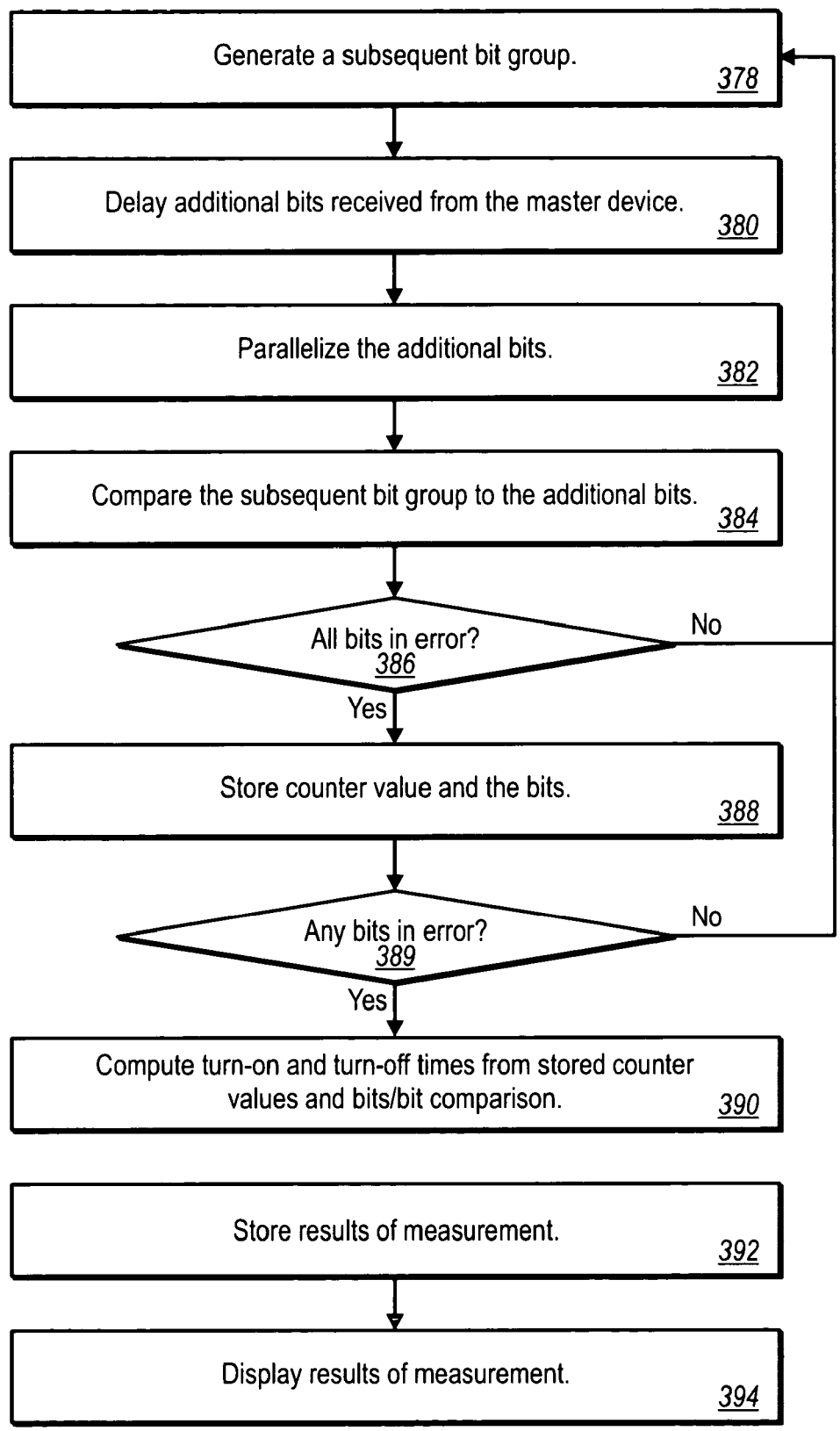

The second BS generator 100 then generates a subsequent bit group from the "subsequent bit group" compared during the most recent execution of step 362 (step 378, FIG. 3E). This previous "subsequent bit group" is fed back to the second BS generator 100. The programmable delay 30 delays another bit group received from the master device 180 (step 380) and then the deserializer 90 parallelizes this bit group (step 382) as described above.

The controller 130 then compares the bit groups transmitted by the deserializer 90 and the second BS generator 100, respectively (step 384). If all of the bits are in error (step 386—Yes), steps 378–384 are repeated. But if not all of the bits are in error (step 386—No), the controller 130 stores the results of each bit comparison and the value of the clock count 141 as part of the measurement data 142 (step 388). And if there are any bits in error (step 389—Yes), steps 378–384 are repeated. In other words, the controller 130 continues to store results of bit comparisons (and corresponding values of the clock count 141) until there are no bit errors.

Once there are no bit errors (step 389—No), the controller 130 calculates the turn-off and turn-on times of the DUT 170 from the data stored in steps 372 and 388, respectively (step 390). In some embodiments, the controller 130 transmits the data stored in steps 372 and 388 to the computer 160, which then calculates the turn-off and turn-on times of the DUT 170. In other embodiments, the controller 130 calculates the turn-off and turn-on times of the DUT 170 and then transmits the results to the computer 160.

In preferred embodiments, computing the turn-off time includes scanning in reverse order from the end of the last bit group stored in step 372 for the bit position of the "last bit" in a string of bits equal to a digital zero and identifies, as the "last clock count value," the value of the clock count 141 that corresponds to the bit group in which this last bit is included. Also, the controller 130 or the computer 160 makes use of a known delay value of the optical fiber ("optical fiber delay") connecting the DUT 170 to the master device 180. This information is then input to an equation as follows:

((((LAST CLOCK COUNT VALUE−1)*(UMBER OF BITS IN A BIT GROUP))+(BIT POSITION OF THE LAST BIT−1))/(BIT RATE OF THE BITS TRANSMITTED SERIALLY))−(OPTICAL FIBER DELAY).

In preferred embodiments, computing the turn-on time includes scanning in reverse order from the end of the penultimate bit group stored in step 388 for the bit position of the "last bit" in a string of bits not in error and identifies, as the "last clock count value," the value of the clock count 141 that corresponds to the bit group in which this last bit is included. This information is then input to an equation as follows:

((((LAST CLOCK COUNT VALUE−1)*(NUMBER OF BITS IN A BIT GROUP))+(BIT POSITION OF THE LAST BIT−1))/(BIT RATE OF THE BITS TRANSMITTED SERIALLY))−(OPTICAL FIBER DELAY).

The computer 160 may then store the results of the measurement in a record 218 of the database 216 (step 392) and display the results of the measurement via the user interface 206 (step 394). If step 394 is reached in this fashion, the results include the turn-off and turn-on times calculated in step 390.

The present invention may be embodied in other specific forms without departing from its spirit or essential characteristics. For example, the steps illustrated in FIGS. 3A–3E have been described as occurring sequentially. Some of these steps, however, may actually occur at roughly the same time or in parallel (e.g., steps 360 and 362 and steps 378 and 380, respectively). The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for measuring a turn-off time of an electronic device, the method comprising:
    generating a first bit sequence by reference to a controlling pattern;
    transmitting the first bit sequence to the electronic device;
    receiving the first bit sequence from the electronic device and a second bit sequence generated by reference to the controlling pattern;
    commanding a disablement of the electronic device after initiating said generating step;
    comparing bit groups from the first bit sequence from the electronic device to corresponding bit groups in the second bit sequence, said comparing step beginning when said commanding step is executed;
    maintaining a count that is incremented each time said comparing step is executed;
    storing each bit group from the first bit sequence from the electronic device that does not match a corresponding bit group in the second bit sequence along with a corresponding value of the count;

terminating said comparing step when a bit group from the first bit sequence from the electronic device indicates that the electronic device is turned off; and computing the turn-off time by reference to at least one stored bit group and corresponding value of the count.

2. The method of claim 1, wherein the first and second bit sequences are deterministic bit sequences.

3. The method of claim 2, wherein the deterministic sequences are pseudorandom bit sequences.

4. The method of claim 1, further comprising:

prior to completing the commanding step, using the first bit sequence as a seed for the generation of the second bit sequence;

terminating the use of the first bit sequence as a seed; and feeding back bit groups of the second sequence to generate the second sequence.

5. The method of claim 1, further comprising synchronizing the first bit sequence with a clock.

6. The method of claim 5, wherein the first bit sequence is synchronized using a programmable delay.

7. The method of claim 1, wherein the electronic device is an electronic transceiver that transmits bits serially through an optical fiber.

8. The method of claim 7 wherein the turn-off time is calculated according to the equation: ((((value of the count −1)*(a number of bits in the bit group))+(a bit position of a last bit −1))/(a bit rate of the bits transmitted serially))−(an optical fiber delay).

9. A method for measuring a turn-on time of an electronic device, the method comprising:

generating a first bit sequence by reference to a controlling pattern;

transmitting the first bit sequence to the electronic device;

receiving the first bit sequence from the electronic device and a second bit sequence generated by reference to the controlling pattern;

commanding an enablement of the electronic device after initiating said generating step;

comparing groups of output values of the electronic device to corresponding bit groups in the second bit sequence, said comparing step beginning when said commanding step is executed;

maintaining a count that is incremented each time said comparing step is executed;

storing comparison results for each group of output values with an output value that matches a corresponding bit in a bit group in the second bit sequence along with a corresponding value of the count;

terminating said comparing step when an entire group of output values matches a corresponding bit group in the second bit sequence; and computing the turn-on time by reference to one or more of the stored comparison results and corresponding counts.

10. The method of claim 9, wherein the first and second bit sequences are deterministic bit sequences.

11. The method of claim 10, wherein the deterministic sequences are pseudorandom bit sequences.

12. The method of claim 9, further comprising:

prior to completing the commanding step, using the first bit sequence as a seed for the generation of the second bit sequence;

terminating the use of the first bit sequence as a seed; and feeding back bit groups of the second sequence to generate the second sequence.

13. The method of claim 9, further comprising synchronizing the first bit sequence with a clock.

14. The method of claim 13, wherein the first bit sequence is synchronized using a programmable delay.

15. The method of claim 9, wherein the electronic device is an electronic transceiver that transmits bits serially through an optical fiber.

16. The method of claim 15 wherein the turn-on time is calculated according to the equation: ((((value of the count −1)*(a number of bits in the bit group))+(a bit position of a last bit −1))/(a bit rate of the bits transmitted serially))−(an optical fiber delay).

17. A method for measuring a turn-off time of an optoelectronic device, the method comprising:

generating a first deterministic bit sequence by reference to a controlling pattern;

transmitting the first bit sequence to the optoelectronic device;

receiving the first bit sequence from the optoelectronic device and a second deterministic bit sequence generated by reference to the controlling pattern;

synchronizing the receiving of the first bit sequence with a clock;

seeding the generation of the second bit sequence, the seeding steps comprising:

using the first bit sequence as a seed for the generation of the second bit sequence, terminating the use of the first bit sequence as a seed; and feeding back bit groups of the second sequence to generate the second sequence;

commanding a disablement of the optoelectronic device after initiating said generating step;

comparing bit groups from the first bit sequence from the optoelectronic device to corresponding bit groups in the second bit sequence, said comparing step beginning when said commanding step is executed;

maintaining a count that is incremented each time said comparing step is executed;

storing each bit group from the first bit sequence from the optoelectronic device that does not match a corresponding bit group in the second bit sequence along with a corresponding value of the count;

terminating said comparing step when a bit group from the first bit sequence from the optoelectronic device indicates that the optoelectronic device is turned off; and computing the turn-off time by reference to at least one stored bit group and corresponding value of the count.

18. The method of claim 17, wherein the deterministic sequences are pseudorandom bit sequences.

19. The method of claim 17, wherein the first bit sequence is synchronized using a programmable delay.

20. The method of claim 17 wherein the turn-off time is calculated according to the equation: ((((value of the count −1)*(a number of bits in the bit group))+(a bit position of a last bit −1))/(a bit rate of the bits transmitted serially))−(an optical fiber delay).

21. A method for measuring a turn-on time of an optoelectronic device, the method comprising:

generating a first deterministic bit sequence by reference to a controlling pattern;

transmitting the first bit sequence to the optoelectronic device;

receiving the first bit sequence from the optoelectronic device and a second deterministic bit sequence generated by reference to the controlling pattern;

synchronizing the receiving of the first bit sequence with a clock;

seeding the generation of the second bit sequence, the seeding steps comprising:
    using the first bit sequence as a seed for the generation of the second bit sequence;
    terminating the use of the first bit sequence as a seed; and
    feeding back bit groups of the second sequence to generate the second sequence;
commanding a disablement of the optoelectronic device after initiating said generating step;
comparing bit groups from the first bit sequence from the optoelectronic device to corresponding bit groups in the second bit sequence, said comparing step beginning when said commanding step is executed;
maintaining a count that is incremented each time said comparing step is executed;
storing each bit group from the first bit sequence from the optoelectronic device that does not match a corresponding bit group in the second bit sequence along with a corresponding value of the count;
terminating said comparing step when a bit group from the first bit sequence from the optoelectronic device indicates that the optoelectronic device is turned on; and
computing the turn-on time by reference to at least one stored bit group and corresponding value of the count.

22. The method of claim 21, wherein the deterministic sequences are pseudorandom bit sequences.

23. The method of claim 21, wherein the first bit sequence is synchronized using a programmable delay.

24. The method of claim 21 wherein the turn-on time is calculated according to the equation: ((((value of the count −1)*(a number of bits in the bit group))+(a bit position of a last bit −1))/(a bit rate of the bits transmitted serially))−(an optical fiber delay).

25. A system for measuring a turn-off time of an electronic device, the system comprising:
    a first bit sequence generator configured to generate a first bit sequence;
    a controller;
    the electronic device configured and arranged for communication with the first sequence generator and the controller, the electronic device being capable of receiving and transmitting the first bit sequence;
    a second bit sequence generator configured to generate a second bit sequence, the first bit sequence having bit groups that correspond with bit groups in the second sequence;
    the controller further configured and arranged to receive and compare the corresponding bit groups in the first bit sequences and the second bit sequence,
        wherein after the electronic device is disabled, the controller continues receiving and comparing corresponding bit groups in the sequences of bits until the bit group comparison indicates that the electronic device is off;
    a counter capable of providing a count corresponding to the receipt of bit groups at the controller, the counter incrementing over a period defined by the disablement of the electronic device and the indication by the comparison of the corresponding bit groups that the electronic device is off;
    a memory configured to store at least one bit group and a corresponding value of the count; and
    the controller further configured to determine the turn-off time by reference to the at least one bit group and corresponding value of the count.

26. The system of claim 25, wherein the first sequence generator and the second sequence generator generate deterministic bit sequences, such that the first and second generators produce the same bit group from the same input.

27. The system of claim 26, wherein the deterministic bit sequences generated by first and second generators are pseudorandom bit sequences.

28. The system of claim 26, wherein the first sequence generator generates a seed value used by the second generator to generate bit groups having corresponding bit groups in the first sequence, the seed value being a bit group generated prior to the generation of the corresponding bit group in the first sequence.

29. The system of claim 25, further comprising an alignment device configured to synchronize the first sequence with a clock.

30. The system of claim 29, wherein the alignment device is a programmable delay.

31. The system of claim 25, wherein determining the turn-off time includes communicating the at least one bit group and corresponding value of the count to an external device.

32. The system of claim 31, wherein the external device is a computer.

33. The system of claim 25, wherein the controller implements logic to calculate the turn-off time.

34. The system of claim 25, wherein the electronic device is an optoelectronic transceiver that transmits bits serially through an optical fiber.

35. The system of claim 34, wherein the controller calculates the turn-off time according to the equation: ((((the clock count −1)*(a number of bits in a bit group))+(a bit position of a last bit −1))/(a bit rate of the bits transmitted serially))−(an optical fiber delay).

36. A system for measuring a turn-on time of an electronic device, the system comprising:
    a first bit sequence generator configured to generate a first bit sequence;
    a controller;
    the electronic device configured and arranged for communication with the first sequence generator and the controller, the electronic device being capable of receiving and transmitting the first bit sequence;
    a second bit sequence generator configured to generate a second bit sequence, the first bit sequence having bit groups that correspond with bit groups in the second sequence;
    the controller further configured and arranged to receive and compare the corresponding bit groups in the first bit sequence and the second bit sequence,
        wherein after the electronic device is enabled, the controller continues receiving and comparing corresponding bit groups in the sequences of bits until the bit group comparison indicates that the electronic device is on;
    a counter capable of providing a count corresponding to the receipt of bit groups at the controller, the counter incrementing over a period defined by the enablement of the electronic device and the indication by the comparison of the corresponding bit groups that the electronic device is on;
    a memory configured to store at least one bit group and a corresponding value of the count; and
    the controller further configured to determine the turn-on time by reference to the at least one bit group and corresponding value of the count.

37. The system of claim 36, wherein the first sequence generator and the second sequence generator generate deterministic bit sequences, such that the first and second generators produce the same bit group from the same input.

38. The system of claim 37, wherein the deterministic bit sequences generated by first and second generators are pseudorandom bit sequences.

39. The system of claim 37, wherein the first sequence generator generates a seed value used by the second generator to generate bit groups having corresponding bit groups in the first sequence, the seed value being a bit group generated prior to the generation of the corresponding bit group in the first sequence.

40. The system of claim 36, further comprising an alignment device configured to synchronize the first sequence with a clock.

41. The system of claim 40, wherein the alignment device is a programmable delay.

42. The system of claim 36, wherein determining the turn-on time includes communicating the at least one bit group and corresponding value of the count to an external device.

43. The system of claim 42, wherein the external device is a computer.

44. The system of claim 36, wherein the controller implements logic to calculate the turn-on time.

45. The system of claim 36, wherein the electronic device is an optoelectronic transceiver that transmits bits serially through an optical fiber.

46. The system of claim 45, wherein the controller calculates the turn-on time according to the equation: ((((the clock count −1)*(a number of bits in a bit group))+(a bit position of a last bit −1))/(a bit rate of the bits transmitted serially))−(an optical fiber delay).

47. A system for measuring a turn-off time of an optoelectronic device, the system comprising:
   a first sequence generator configured to generate a first deterministic bit sequence by reference to a controlling pattern;
   a controller;
   the optoelectronic device configured and arranged for communication with the first sequence generator and the controller, the optoelectronic device being capable of receiving and transmitting the first bit sequence serially;
   an alignment device configured to synchronize the first sequence with a clock;
   a second big sequence generator configured to generate a second deterministic bit sequence by reference to the controlling pattern;
   the first bit sequence having bit groups that correspond with bit groups in the second sequence;
   the first sequence generator further configured to generate a seed value used by the second generator to generate bit groups having corresponding bit groups in the first sequence, the seed value being a bit group generated prior to the generation of the corresponding bit group in the first sequence;
   the controller further configured and arranged to receive and compare the corresponding bit groups in the first bit sequence and the second bit sequence,
      wherein after the optoelectronic device is disabled, the controller continues receiving and comparing corresponding bit groups in the sequences of bits until the bit group comparison indicates that the optoelectronic device is off;
   a counter capable of providing a count corresponding to the receipt of bit groups at the controller, the counter incrementing over a period defined by the disablement of the optoelectronic device and the indication by the comparison of the corresponding bit groups that the optoelectronic device is off;
   a memory configured to store at least one bit group and a corresponding value of the count; and
   the controller further configured to determine the turn-off time of the optoelectronic device by reference to the at least one bit group and corresponding value of the count.

48. The system of claim 47, wherein the deterministic bit sequences generated by first and second generators are pseudorandom bit sequences.

49. The system of claim 47, wherein the alignment device is a programmable delay.

50. The system of claim 47, wherein determining the turn-off time includes communicating the at least one bit group and corresponding value of the count to an external device.

51. The system of claim 47, wherein the controller calculates the turn-off time according to the equation: ((((the clock count −1)*(a number of bits in a bit group))+(a bit position of a last bit −1))/(a bit rate of the bits transmitted serially))−(an optical fiber delay).

52. A system for measuring the turn-on time of an optoelectronic device, the system comprising:
   a first bit sequence generator configured to generate a first deterministic bit sequence by reference to a controlling pattern;
   a controller;
   the optoelectronic device configured and arranged for communication with the first sequence generator and the controller, the optoelectronic device being capable of receiving and transmitting the first bit sequence serially;
   an alignment device configured to synchronize the first sequence with a clock;
   a second bit sequence generator configured to generate a second deterministic bit sequence by reference to the controlling pattern;
   the first bit sequence having bit groups that correspond with bit groups in the second sequence;
   the first sequence generator further configured to generate a seed value used by the second generator to generate bit groups having corresponding bit groups in the first sequence, the seed value being a bit group generated prior to the generation of the corresponding bit group in the first sequence;
   the controller further configured and arranged to receive and compare the corresponding bit groups in the first bit sequence and the second bit sequence,
      wherein after the optoelectronic device is disabled, the controller continues receiving and comparing corresponding bit groups in the sequences of bits until the bit group comparison indicates that the optoelectronic device is on;
   a counter capable of providing a count corresponding to the receipt of bit groups at the controller, the counter incrementing over a period defined by the disablement of the optoelectronic device and the indication by the comparison of the corresponding bit groups that the optoelectronic device is on;

a memory configured to store at least one bit group and a corresponding value of the count; and the controller further configured to determine the turn-on time by reference to the at least one bit group and corresponding value of the count.

53. The system of claim 52, wherein the deterministic bit sequences generated by first and second generators are pseudorandom bit sequences.

54. The system of claim 52, wherein the alignment device is a programmable delay.

55. The system of claim 52, wherein determining the turn-on time includes communicating the at least one bit groups and corresponding value of the count to an external device.

56. The system of claim 52, wherein the controller calculates the turn-on time according to the equation: ((((the clock count −1)*(a number of bits in a bit group))+(a bit position of a last bit −1))/(a bit rate of the bits transmitted serially))−(an optical fiber delay).

* * * * *

UNITED STATES PATENT AND TRADEMARK OFFICE
CERTIFICATE OF CORRECTION

PATENT NO. : 7,222,042 B2  Page 1 of 2
APPLICATION NO. : 10/694933
DATED : May 22, 2007
INVENTOR(S) : Fishman et al.

It is certified that error appears in the above-identified patent and that said Letters Patent is hereby corrected as shown below:

Drawings
Sheet 5, Fig. 3C, replace a portion of Fig. 3C with the figure portion below, wherein at the "yes" instance of step 354 "To Step 388" is changed to --To Step 394--

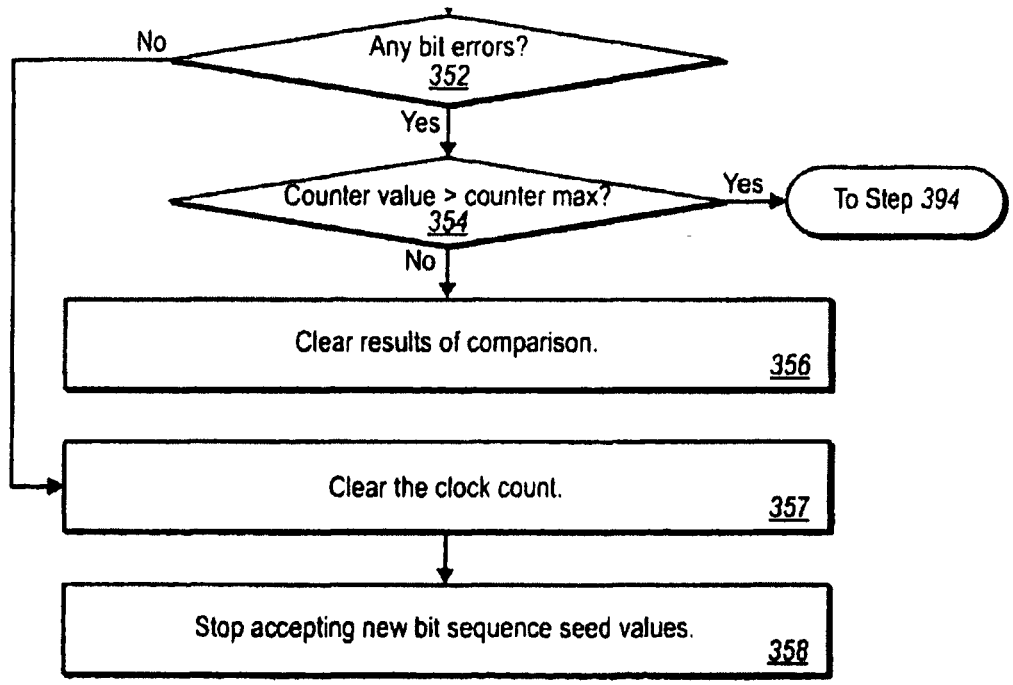

Fig. 3C

Drawings
Sheet 7, Fig. 3E, replace a portion of the figure with the figure portion below, wherein on steps "386" and "389", "yes" is changed to --no-- and "no" to --yes-- on both instances

CERTIFICATE OF CORRECTION (continued)
U.S. Pat. No. 7,222,042 B2

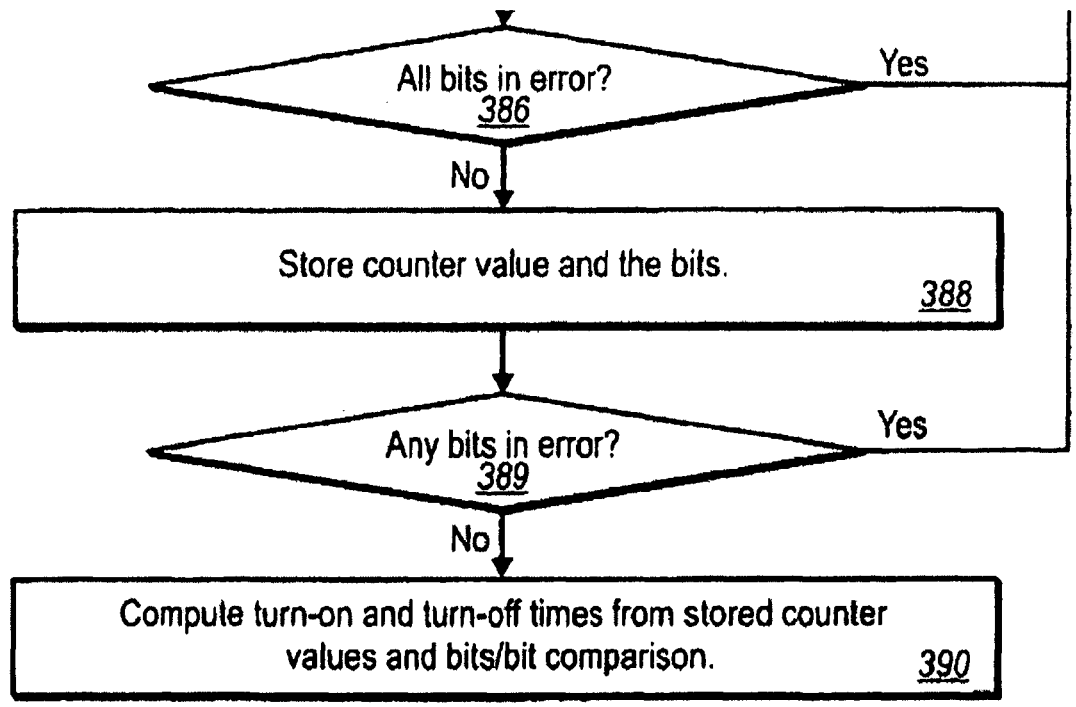

Column 5
Line 22, change "a I/O port" to --an I/O port--

Column 7
Line 33, change "system may" to --system 212 may--

Column 9
Line 18, change "170Q" to --170--

Signed and Sealed this

Thirtieth Day of March, 2010

David J. Kappos
*Director of the United States Patent and Trademark Office*